United States Patent
Jernigan, IV et al.

(10) Patent No.: US 9,710,478 B2
(45) Date of Patent: Jul. 18, 2017

(54) SYSTEM AND METHOD FOR ADAPTIVE DATA PLACEMENT WITHIN A DISTRIBUTED FILE SYSTEM

(71) Applicant: NetApp, Inc., Sunnyvale, CA (US)

(72) Inventors: Richard P. Jernigan, IV, Sewickley, PA (US); Robert Wyckoff Hyer, Jr., Seven Fields, PA (US); Daniel Tennant, Pittsburgh, PA (US)

(73) Assignee: NETAPP, INC., Sunnyvale, CA (US)

( * ) Notice: Subject to any disclaimer, the term of this patent is extended or adjusted under 35 U.S.C. 154(b) by 540 days.

(21) Appl. No.: 14/268,059

(22) Filed: May 2, 2014

(65) Prior Publication Data

US 2015/0317407 A1    Nov. 5, 2015

(51) Int. Cl.
G06F 17/30    (2006.01)

(52) U.S. Cl.
CPC .... *G06F 17/30115* (2013.01); *G06F 17/3053* (2013.01); *G06F 17/30094* (2013.01); *G06F 17/30194* (2013.01); *G06F 17/30864* (2013.01); *G06F 17/30952* (2013.01)

(58) Field of Classification Search
CPC ......... G06F 17/30067; G06F 17/30073; G06F 3/0683
USPC ........................................ 707/802, 803, 812
See application file for complete search history.

(56) References Cited

U.S. PATENT DOCUMENTS

| | | | |
|---|---|---|---|
| 5,819,292 A | 10/1998 | Hitz et al. | |
| 6,671,773 B2 | 12/2003 | Kazar et al. | |
| 7,409,494 B2 | 8/2008 | Edwards et al. | |
| 2004/0018844 A1* | 1/2004 | Cheng | H04L 41/12 455/456.1 |
| 2007/0130424 A1* | 6/2007 | Hashimoto | G06F 3/0607 711/114 |
| 2009/0031385 A1* | 1/2009 | Karnalkar | H04N 21/2312 725/131 |
| 2012/0140902 A1* | 6/2012 | Tai | H04M 3/2218 379/32.01 |
| 2012/0159502 A1* | 6/2012 | Levin | G06F 9/5016 718/104 |
| 2013/0290464 A1* | 10/2013 | Barrall | G06F 17/30292 709/213 |
| 2014/0304226 A1* | 10/2014 | Tsuchiya | G06F 17/30575 707/610 |
| 2014/0337442 A1* | 11/2014 | Zhuang | H04L 51/06 709/206 |
| 2015/0279486 A1* | 10/2015 | Leavitt | G06F 11/1004 714/723 |

* cited by examiner

*Primary Examiner* — Rehana Perveen
*Assistant Examiner* — Loc Tran
(74) *Attorney, Agent, or Firm* — Nixon Peabody LLP; Khaled Shami

(57) ABSTRACT

A system and method for adaptive data placement in a distributed file system is provided. Upon creation of a new subdirectory, a first heuristic procedure is formed to determine whether the newly created subdirectory should be created locally or on a remote flexible volume. Should it be determination be made to create or store the subdirectory on a remote flexible volume, a second heuristic procedure determines which of a plurality of flexible volumes should store the newly created subdirectory.

13 Claims, 10 Drawing Sheets

SYSTEM AND METHOD FOR ADAPTIVE DATA PLACEMENT WITHIN A DISTRIBUTED FILE SYSTEM

TECHNICAL FIELD

The disclosure is directed to storage systems and, more particularly to selecting a location for placing a data container in a distributed file system.

BACKGROUND INFORMATION

Distributed file systems may utilize a plurality of flexible (virtual) volumes that are hosted by a plurality of nodes, and that are logically joined together to provide a unified storage space. Individual flexible volumes may be linked to other flexible volumes within the unified storage space via constructs called junctions. Illustratively, junctions may identify a particular flexible volume and/or a particular node that stores a data container referenced by the junction. For example, a directory, stored on a flexible volume, may include a junction indicating that a subdirectory is stored on another flexible volume that may be service by a different storage system. The subdirectory may comprise additional junctions associated with subdirectories of the subdirectory.

In conventional distributed storage systems, when a user desires to generate a new subdirectory, a system administrator must determine which of a plurality of flexible volumes within the distributed storage system should be utilized to store the desired subdirectory. Poor choice in selecting how the subdirectories are allocated among the flexible volumes may result in poor performance for the distributed file system. That is, for example, should a plurality of subdirectories be located on a single flexible volume, the flexible volume may become overloaded due to the volume of data access request directed to it. This may result in a significant degradation in the performance of the flexible volume, and/or the distributed file system as a whole.

BRIEF DESCRIPTION OF THE DRAWINGS

The above and further advantages of disclosure may be better understood by referring to the following description in conjunction with the accompanying drawings in which like reference numerals indicate identical or functionally similar elements.

DETAILED DESCRIPTION

Overview

Figure 1:
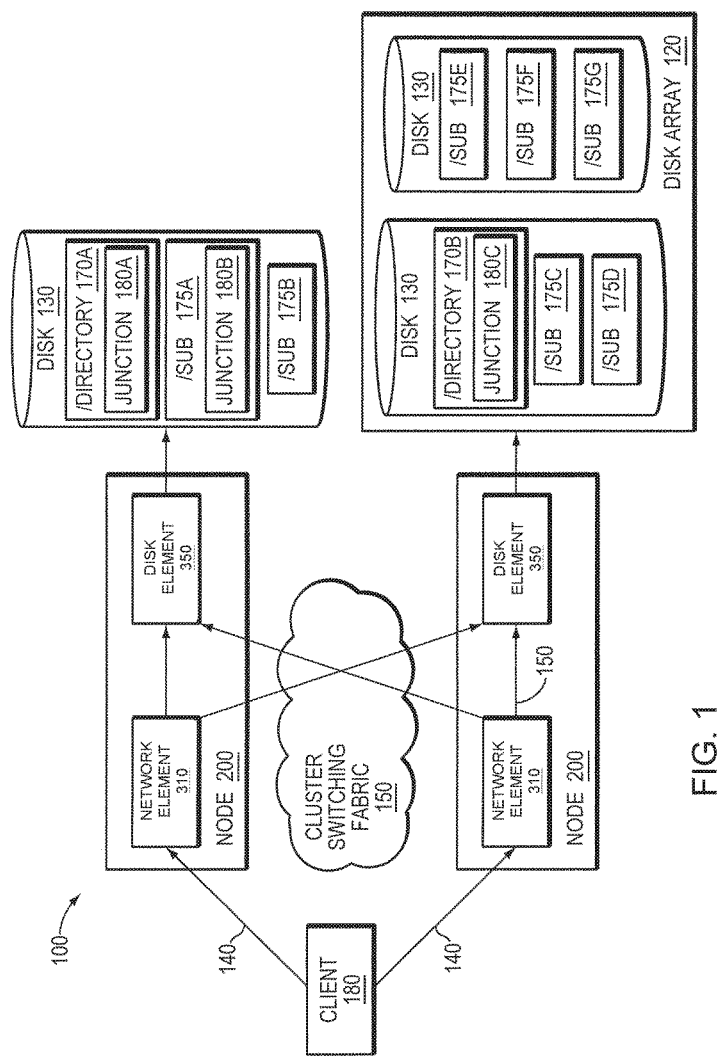
FIG. 1 is an exemplary schematic block diagram of a plurality of nodes interconnected as a cluster.

The disclosure is directed to a system and method for adaptive data placement of a newly created data container, such as a subdirectory, among the plurality of possible storage containers, e.g. flexible volumes, in a distributed file system. When a command is received to create a new data container, such as a subdirectory, a remote access module performs a first heuristic procedure to determine whether the new subdirectory should be created locally, i.e. on a flexible volume associated with the physical node executing the command, or whether the subdirectory should be created remotely, i.e. on a flexible volume associated with a node not directly attached to the node generating the command. Illustratively, this determination may be performed by calculating an urgency factor, a disparity factor and a local factor for the new subdirectory and using these calculated factors in addition to an assigned category to determine a likelihood of local allocation. Illustratively, the likelihood of local allocation is represented by a percentage value, i.e., a value from 0-100. A random number between 0-100 is then generated and compared to the likelihood of local allocation. Should the generated random number be less than or equal to the likelihood of local application, the subdirectory is created on a local flexible volume. Conversely, if the generated random number is greater than the likelihood of local allocation, then the subdirectory will be created on a remote flexible volume.

If the subdirectory is to be created remotely, a second heuristic procedure is performed by the remote access module to determine which remote flexible volume should hold the new subdirectory. The second heuristic procedure illustratively calculates a recent percentage value and a target percentage value for each remote flexible volume in the distributed file system. The second heuristic procedure then selects the remote flexible volume that will result in the largest difference between the target percentage value recent percentage value. The subdirectory is then created on the identified remote flexible volume.

Cluster Environment

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files and logical units. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from NetApp™, Inc., Sunnyvale, Calif.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element 310 and a disk element 350. The network element 310 includes functionality that enables the node 200 to connect to clients 180 over a computer network 140, while each disk element 350 connects to one or more storage devices, such as disks 130 of a disk array 120. The nodes 200 are interconnected by a cluster switching fabric 150 which, in an example, may be embodied as a Gigabit Ethernet switch. An exemplary distributed file system architecture is generally described in U.S. Pat. No. 6,671,773 titled METHOD AND SYSTEM FOR RESPONDING TO FILE SYSTEM REQUESTS, by M. Kazar et al., issued Dec. 30, 2003. It should be noted that while there is shown an equal number of network and disk elements in the illustrative cluster 100, there may be differing numbers of network and/or disk elements. For example, there may be a plurality of network elements and/or disk elements interconnected in a cluster configuration 100 that does not reflect a one-to-one correspondence between the network and disk elements. As such, the description of a node 200 comprising one network elements and one disk element should be taken as illustrative only.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

Disk elements 350 are illustratively connected to disks 130, that may be organized into disk arrays 120. Alternatively, storage devices other than disks may be utilized, e.g., flash memory, optical storage, solid state devices, etc. As such, the description of disks should be taken as exemplary only.

As described below, in reference to FIG. 3, a file system 360 may implement a plurality of flexible volumes on the disks 130. Flexible volumes may comprise a plurality of directories 170 A, B and a plurality of subdirectories 175 A-G. Junctions 180 A-C may be located in directories 170 and/or subdirectories 175. It should be noted that the distribution of directories 170, subdirectories 175 and junctions 180 shown in FIG. 1 is for illustrative purposes. As such, the description of the directory structure relating to subdirectories and/or junctions should be taken as exemplary only.

Storage System Node

Figure 2:
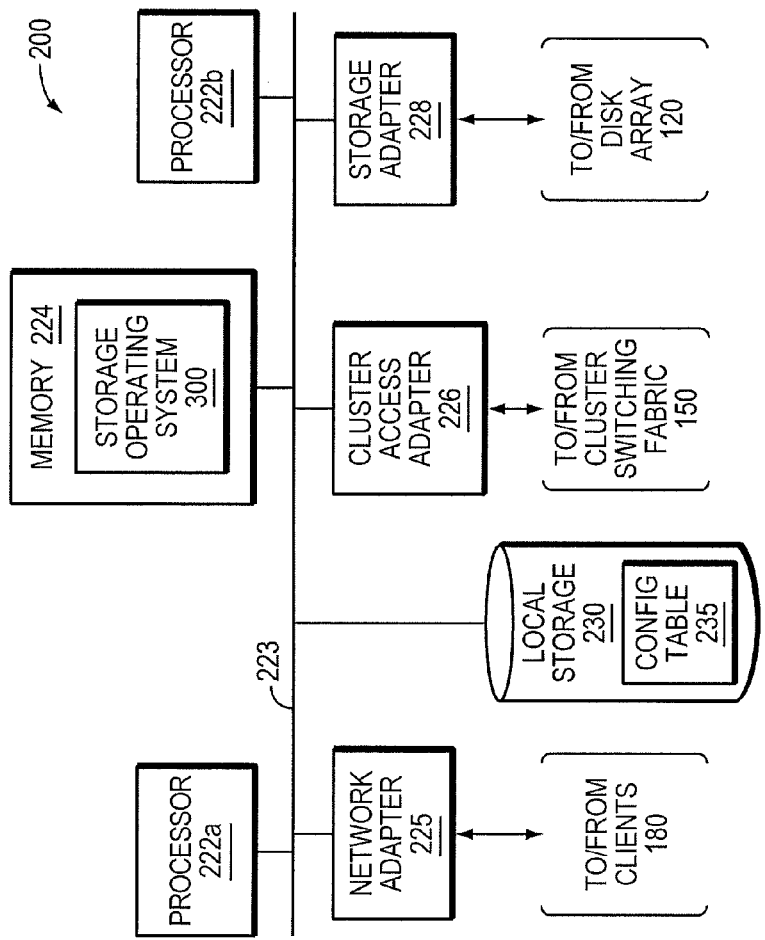
FIG. 2 is an exemplary schematic block diagram of a node.

FIG. 2 is a schematic block diagram of a node 200 that is illustratively embodied as a storage system comprising a plurality of processors 222a,b, a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information (e.g., in configuration table 235). The cluster access adapter 226 comprises a plurality of ports adapted to couple the node 200 to other nodes of the cluster 100. Illustratively, Ethernet is used as the clustering protocol and interconnect media, although it will be apparent to those skilled in the art that other types of protocols and interconnects may be utilized within the cluster architecture described herein. Alternatively, where the network elements and disk elements are implemented on separate storage systems or computers, the cluster access adapter 226 is utilized by the network and disk element for communicating with other network and disk elements in the cluster 100.

Each node 200 is illustratively embodied as a dual processor storage system executing a storage operating system 300 that preferably implements a high-level module, such as a file system, to logically organize the information as a hierarchical structure of named directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the network element 310 on the node, while the other processor 222b executes the functions of the disk element 350.

The memory 224 illustratively comprises storage locations that are addressable by the processors and adapters for storing software program code and data structures associated with the subject matter of the disclosure. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the disclosure described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

Illustratively, the storage operating system is preferably the Data ONTAP® operating system available from NetApp™, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this disclosure.

Figure 3:
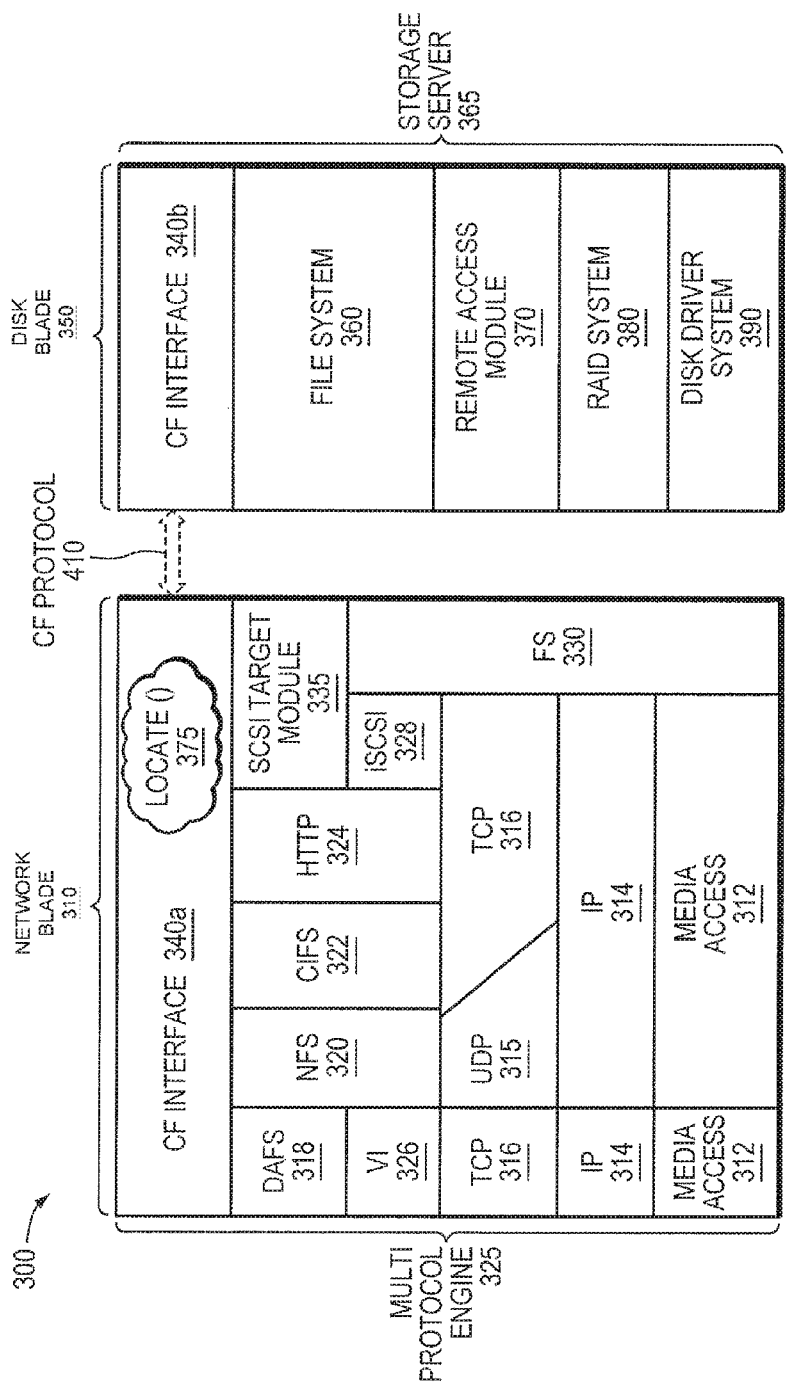
FIG. 3 is an exemplary schematic block diagram of a storage operating system.

FIG. 3 is a schematic block diagram of the storage operating system 300 that may be advantageously used with the subject matter. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360 in cooperating relation with a remote access module 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol.

The file system 360 implements a virtualization system of the storage operating system 300 through the interaction with one or more virtualization modules illustratively embodied as, e.g., a virtual disk (vdisk) module (not shown)

and a SCSI target module 335. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements an exemplary a file system having an on-disk format representation that is block-based using, e.g., 4 kilobyte (kB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

The remote access module 370 is operatively interfaced between the file system module 360 and the RAID system module 380. Remote access module 370 is illustratively configured as part of the file system to implement the functionality to determine whether a newly created data container, such as a subdirectory, should be stored locally or remotely. Alternatively, the remote access module 370 may be separate from the file system. As such, the description of the remote access module being part of the file system should be taken as exemplary only. Further, the remote access module 370 determines which remote flexible volume should store a new subdirectory if a determination is made that the subdirectory is to be stored remotely. More generally, the remote access module 370 implements the heuristics algorithms used for the adaptive data placement. However, it should be noted that the use of a remote access module should be taken as illustrative. In alternative aspects, the functionality may be integrated into the file system or other module of the storage operating system. As such, the description of the remote access module 370 performing certain functions should be taken as exemplary only.

It should be noted that while the subject matter is described in terms of locating new subdirectories, the principles of the disclosure may be applied at other levels of granularity, e.g., files, blocks, etc. As such, the description contained herein relating to subdirectories should be taken as exemplary only.

It should be noted that the software "path" through the storage operating system layers described above needed to perform data storage access for the client request received at the node may alternatively be implemented in hardware. That is, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Alternatively, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that aspects of the disclosure described herein may apply to any type of special-purpose (e.g., file server, filer or storage serving appliance) or general-purpose computer, including a standalone computer or portion thereof, embodied as or including a storage system. Moreover, the teachings contained hereincan be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the subject matter may be utilized with any suitable file system, including a write in place file system.

CF Protocol

Illustratively, the storage server 365 is embodied as disk element 350 of the storage operating system 300 to service one or more volumes of array 120. In addition, the multi-protocol engine 325 is embodied as network element 310 to (i) perform protocol termination with respect to a client issuing incoming data access request packets over the network 140, as well as (ii) redirect those data access requests to any storage server 365 of the cluster 100. Moreover, the network element 310 and disk element 350 cooperate to provide a highly-scalable, distributed storage system architecture of the cluster 100. To that end, each module includes a cluster fabric (CF) interface module 340a,b adapted to implement intra-cluster communication among the modules, including disk element to disk element communication for data container striping operations described herein.

The protocol layers, e.g., the NFS/CIFS layers and the iSCSI/IFC layers, of the network element 310 function as protocol servers that translate file-based and block based data access requests from clients into CF protocol messages used for communication with the disk element 350. That is, the network element servers convert the incoming data access requests into file system primitive operations (commands) that are embedded within CF messages by the CF interface module 340 for transmission to the disk elements 350 of the cluster 100. Notably, the CF interface modules 340 cooperate to provide a single file system image across all disk elements 350 in the cluster 100. Thus, any network port of an network element that receives a client request can access any data container within the single file system image located on any disk element 350 of the cluster.

Further, in an illustrative aspect of the disclosure, the network element 310 and disk element 350 are implemented as separately-scheduled processes of storage operating system 300; however, in an alternate aspect, the modules may be implemented as pieces of code within a single operating system process. Communication between an network element and disk element is thus illustratively effected through the use of message passing between the modules although, in the case of remote communication between an network element and disk element of different nodes, such message passing occurs over the cluster switching fabric 150. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from NetApp™, Inc. The SpinFS protocol is described in the above-referenced U.S. Pat. No. 6,671,773.

The CF interface module 340 implements the CF protocol for communicating file system commands among the modules of cluster 100. Communication is illustratively effected by the disk element exposing the CF API to which an network element (or another disk element) issues calls. To that end, the CF interface module 340 is organized as a CF encoder and CF decoder. The CF encoder of, e.g., CF interface 340a on network element 310 encapsulates a CF message as (i) a local procedure call (LPC) when communicating a file system command to a disk element 350 residing on the same node 200 or (ii) a remote procedure call (RPC) when communicating the command to a disk element residing on a remote node of the cluster 100. In either case, the CF decoder of CF interface 340b on disk element 350 de-encapsulates the CF message and processes the file system command.

Illustratively, the remote access module 370 may utilize CF messages to communicate with remote nodes to collect information relating to remote flexible volumes. Such information gathering is described below in reference to FIG. 11.

Figure 4:
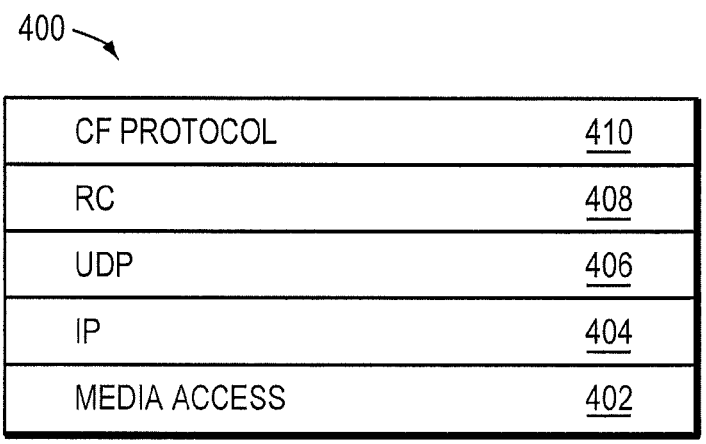
FIG. 4 is an exemplary schematic block diagram illustrating the format of a cluster fabric (CF) message.

FIG. 4 is a schematic block diagram illustrating the format of a CF message 400. The CF message 400 is illustratively used for RPC communication over the switching fabric 150 between remote modules of the cluster 100; however, it should be understood that the term "CF message" may be used generally to refer to LPC and RPC communication between modules of the cluster. The CF message 400 includes a media access layer 402, an IP layer 404, a UDP layer 406, a reliable connection (RC) layer 408 and a CF protocol layer 410. As noted, the CF protocol is a generic file system protocol that conveys file system commands related to operations contained within client requests to access data containers stored on the cluster 100; the CF protocol layer 410 is that portion of message 400 that carries the file system commands. Illustratively, the CF protocol is datagram based and, as such, involves transmission of messages or "envelopes" in a reliable manner from a source (e.g., an network element 310) to a destination (e.g., a disk element 350). The RC layer 408 implements a reliable transport protocol that is adapted to process such envelopes in accordance with a connectionless protocol, such as UDP 406.

File System Organization

Figure 5:
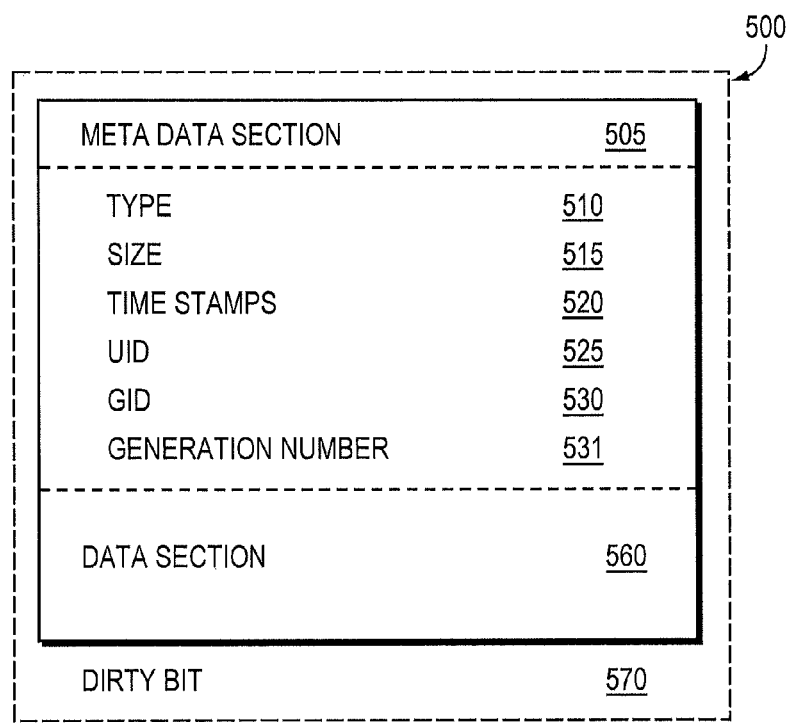
FIG. 5 is an exemplary schematic block diagram of an inode.

Illustratively, a data container is represented in the write-anywhere file system as an inode data structure adapted for storage on the disks 130. FIG. 5 is a schematic block diagram of an inode 500, which preferably includes a meta-data section 505 and a data section 560. The information stored in the meta-data section 505 of each inode 500 describes the data container (e.g., a file) and, as such, includes the type (e.g., regular, directory, vdisk) 510 of file, its size 515, time stamps (e.g., access and/or modification time) 520 and ownership, i.e., user identifier (UID 525) and group ID (GID 530), of the file, and a generation number 531. The contents of the data section 560 of each inode may be interpreted differently depending upon the type of file (inode) defined within the type field 510. For example, the data section 560 of a directory inode contains meta-data controlled by the file system, whereas the data section of a regular inode contains file system data. In this latter case, the data section 560 includes a representation of the data associated with the file.

Specifically, the data section 560 of a regular on-disk inode may include file system data or pointers, the latter referencing 4 KB data blocks on disk used to store the file system data. Each pointer is preferably a logical vbn to facilitate efficiency among the file system and the RAID system 380 when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 560 of the inode (e.g., a second level inode) references an indirect block (e.g., a first level L1 block) that contains 1024 pointers, each of which references a 4 KB data block on disk. For file system data having a size greater than 64 MB, each pointer in the data section 560 of the inode (e.g., a third level L3 inode) references a double-indirect block (e.g., a second level L2 block) that contains 1024 pointers, each referencing an indirect (e.g., a first level L1) block. The indirect block, in turn, that contains 1024 pointers, each of which references a 4 kB data block on disk. When accessing a file, each block of the file may be loaded from disk 130 into the memory 224.

When an on-disk inode (or block) is loaded from disk 130 into memory 224, its corresponding in-core structure embeds the on-disk structure. For example, the dotted line surrounding the inode 500 indicates the in-core representation of the on-disk inode structure. The in-core structure is a block of memory that stores the on-disk structure plus additional information needed to manage data in the memory (but not on disk). The additional information may include, e.g., a "dirty" bit 570. After data in the inode (or block) is updated/modified as instructed by, e.g., a write operation, the modified data is marked "dirty" using the dirty bit 570 so that the inode (block) can be subsequently "flushed" (stored) to disk. The in-core and on-disk format structures of the exemplary file system, including the inodes and inode file, are disclosed and described in the previously incorporated U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

Figure 6:
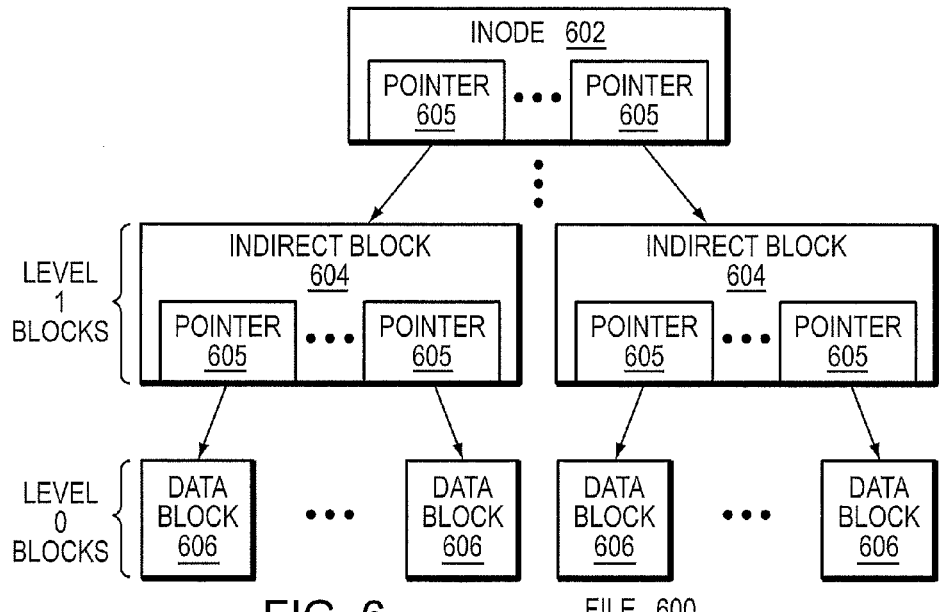
FIG. 6 is an exemplary schematic block diagram of a buffer tree.

FIG. 6 is a schematic block diagram of a buffer tree of a file 600. The buffer tree is an internal representation of blocks for a file (e.g., file 600) loaded into the memory 224 and maintained by the write-anywhere file system 360. A root (top-level) inode 602, such as an embedded inode, references indirect (e.g., level 1) blocks 604. Note that there may be additional levels of indirect blocks (e.g., level 2, level 3) depending upon the size of the file. The indirect blocks (and inode) contain pointers 605 that ultimately reference data blocks 606 used to store the actual data of the file. That is, the data of file 600 are contained in data blocks and the locations of these blocks are stored in the indirect blocks of the file. Each level 1 indirect block 604 may contain pointers to as many as 1024 data blocks. According to the "write anywhere" nature of the file system, these blocks may be located anywhere on the disks 130.

A file system layout is provided that apportions an underlying physical volume into one or more virtual volumes (or flexible volume) of a storage system, such as node 200. An example of such a file system layout is described in U.S. Pat. No. 7,409,494 titled EXTENSION OF WRITE ANYWHERE FILE SYSTEM LAYOUT, by John K. Edwards et al. and assigned to NetApp™, Inc. The underlying physical volume is an aggregate comprising one or more groups of disks, such as RAID groups, of the node. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In one aspect of the disclosure, pvbns are used as block pointers within buffer trees of files (such as file 600) stored in a flexible volume. This "hybrid" flexible volume example involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 300.

Figure 7:
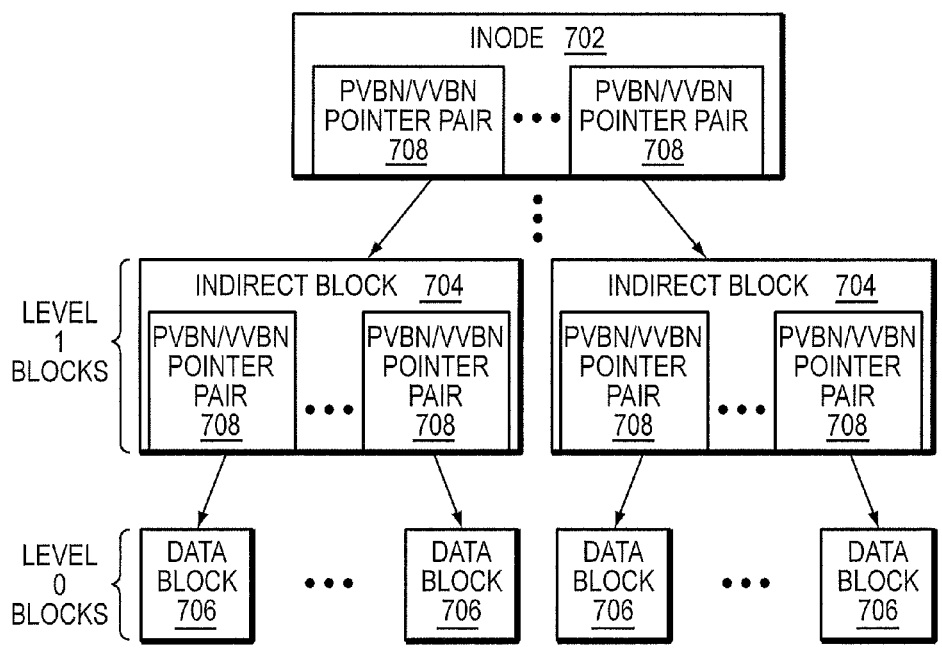
FIG. 7 is an exemplary schematic block diagram of a buffer tree of a file.

In an illustrative dual vbn hybrid flexible volume example, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks. FIG. 7 is a schematic block diagram of a buffer tree of a file 700. A root (top-level) inode 702, such as an embedded inode, references indirect (e.g., level 1) blocks 704. Note that there may be additional levels of indirect blocks (e.g., level 2, level 3) depending upon the size of the file. The indirect blocks (and inode) contain pvbn/vvbn pointer pair structures 808 that ultimately reference data blocks 706 used to store the actual data of the file.

The pvbns reference locations on disks of the aggregate, whereas the vvbns reference locations within files of the flexible volume. The use of pvbns as block pointers 708 in the indirect blocks 704 provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Figure 8:
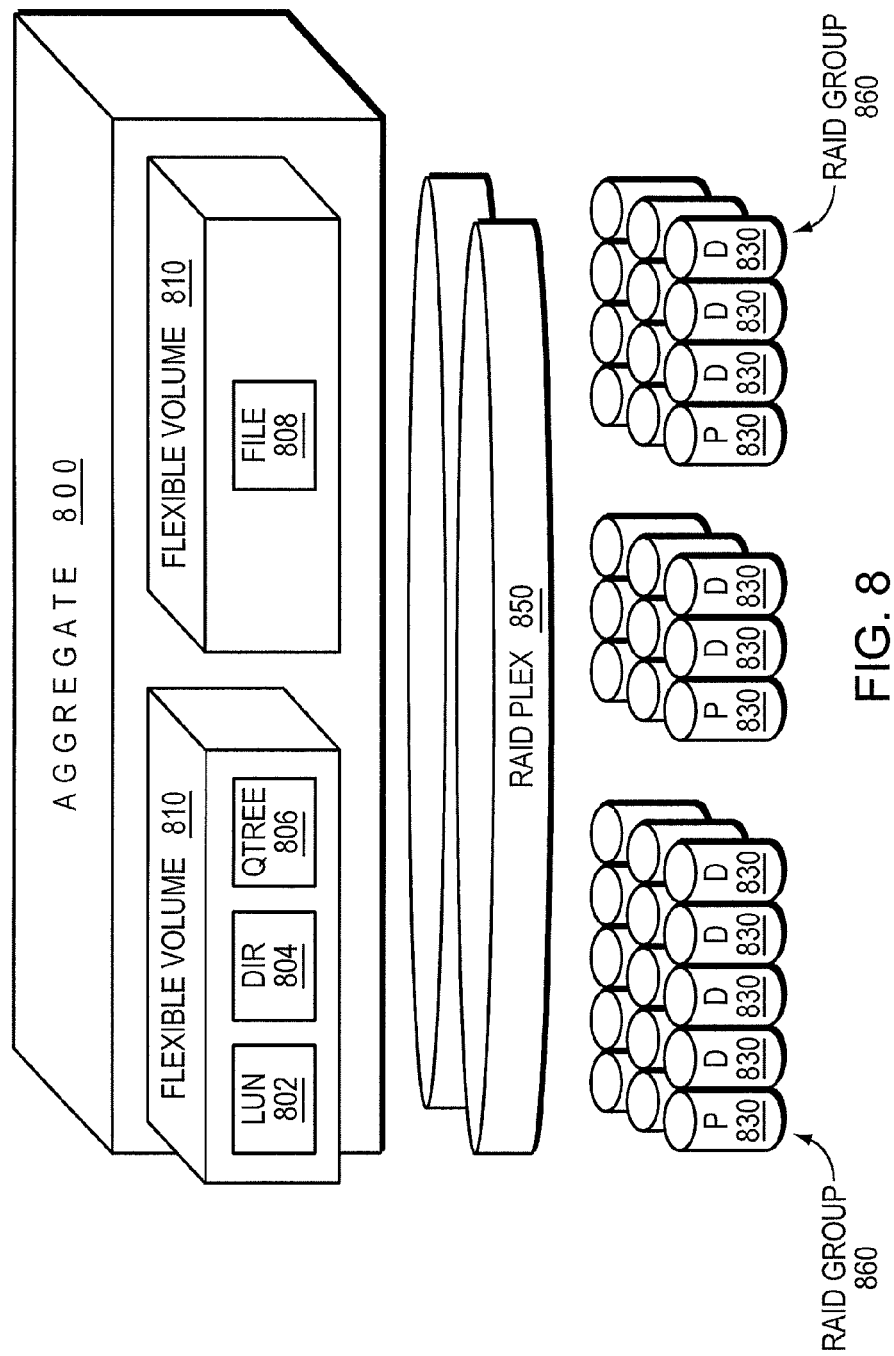
FIG. 8 is an exemplary schematic block diagram of an aggregate.

FIG. 8 is a schematic block diagram of an aggregate 800. Luns (blocks) 802, directories 804, qtrees 806 and files 808 may be contained within flexible volumes 810, such as dual vbn flexible volumes, that, in turn, are contained within the aggregate 800. It should be noted that in accordance with alternative aspects of the disclosure, the flexible volumes 810 including elements within the flexible volumes may comprise junctions to provide redirection information to other flexible volumes, which may be contained within the same aggregate 804, may be stored in aggregate service by other key modules in the distributed file system. Assets, the description of elements being stored within a flexible volume 810 should be taken as exemplary only. The aggregate 800 is illustratively layered on top of the RAID system, which is represented by at least one RAID plex 850 (depending upon whether the storage configuration is mirrored), wherein each plex 850 comprises at least one RAID group 860. Each RAID group further comprises a plurality of disks 830, e.g., one or more data (D) disks and at least one (P) parity disk.

Whereas the aggregate 800 is analogous to a physical volume of a conventional storage system, a flexible volume is analogous to a file within that physical volume. That is, the aggregate 800 may include one or more files, wherein each file contains a flexible volume 810 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 810 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden meta-data root directory that contains subdirectories of flexible volumes:

WAFL/fsid/filesystem file, storage label file

Specifically, a physical file system directory includes a subdirectory for each flexible volume in the aggregate, with the name of subdirectory being a file system identifier (fsid) of the flexible volume. Each fsid subdirectory (flexible volume) contains at least two files, a filesystem file and a storage label file. The storage label file is illustratively a 4 kB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Figure 9:
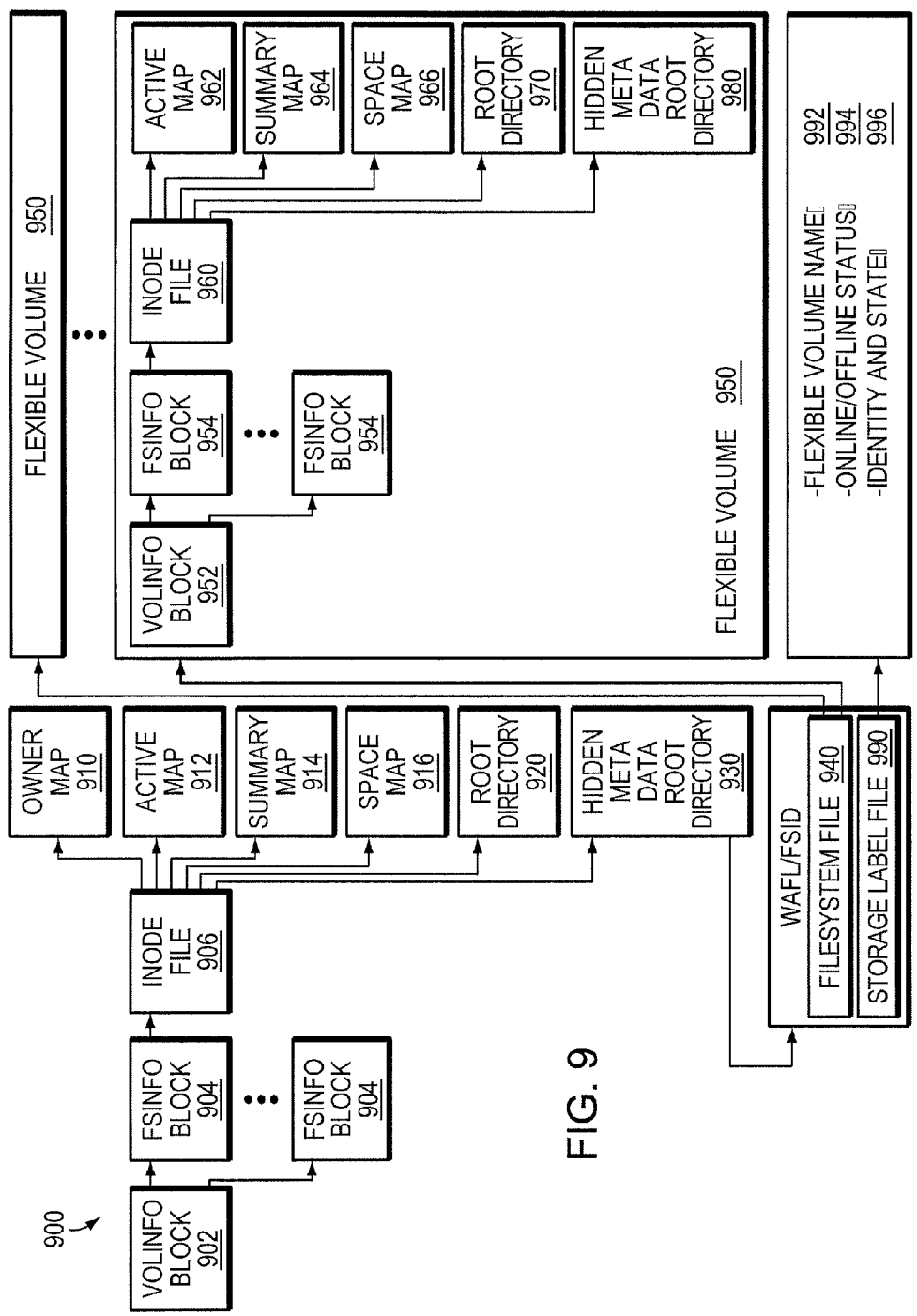
FIG. 9 is an exemplary schematic block diagram of an on-disk layout of the aggregate.

FIG. 9 is a schematic block diagram of an on-disk representation of an aggregate 900. The storage operating system 300, e.g., the RAID system 380, assembles a physical volume of pvbns to create the aggregate 900, with pvbns 1 and 2 comprising a "physical" volinfo block 902 for the aggregate. The volinfo block 902 contains block pointers to fsinfo blocks 904, each of which may represent a snapshot of the aggregate. Each fsinfo block 904 includes a block pointer to an inode file 906 that contains inodes of a plurality of files, including an owner map 910, an active map 912, a summary map 914 and a space map 916, as well as other special meta-data files. The inode file 906 further includes a root directory 920 and a "hidden" meta-data root directory 930, the latter of which includes a namespace having files related to a flexible volume in which users cannot "see" the files. The hidden meta-data root directory includes the WAFL/fsid/ directory structure that contains filesystem file 940 and storage label file 990. Note that root directory 920 in the aggregate is empty; all files related to the aggregate are organized within the hidden meta-data root directory 930.

In addition to being embodied as a container file having level 1 blocks organized as a container map, the filesystem file 940 includes block pointers that reference various file systems embodied as flexible volumes 950. The aggregate 900 maintains these flexible volumes 950 at special reserved inode numbers. Each flexible volume 950 also has special reserved inode numbers within its flexible volume space that are used for, among other things, the block allocation bitmap structures. As noted, the block allocation bitmap structures, e.g., active map 962, summary map 964 and space map 966, are located in each flexible volume.

Specifically, each flexible volume 950 has the same inode file structure/content as the aggregate, with the exception that there is no owner map and no WAFL/fsid/filesystem file, storage label file directory structure in a hidden meta-data root directory 980. To that end, each flexible volume 950 has a volinfo block 952 that points to one or more fsinfo blocks 954, each of which may represent a snapshot, along with the active file system of the flexible volume. Each fsinfo block, in turn, points to an inode file 960 that, as noted, has the same inode structure/content as the aggregate with the exceptions noted above. Each flexible volume 950 has its own inode file 960 and distinct inode space with corresponding inode numbers, as well as its own root (fsid) directory 970 and subdirectories of files that can be exported separately from other flexible volumes.

The storage label file 990 contained within the hidden meta-data root directory 930 of the aggregate is a small file that functions as an analog to a conventional raid label. A raid label includes physical information about the storage system, such as the volume name; that information is loaded into the storage label file 990. Illustratively, the storage label file 990 includes the name 992 of the associated flexible volume 950, the online/offline status 994 of the flexible volume, and other identity and state information 996 of the associated flexible volume (whether it is in the process of being created or destroyed).

Assigning a New Subdirectory to a Flexible Volume

Figure 10:
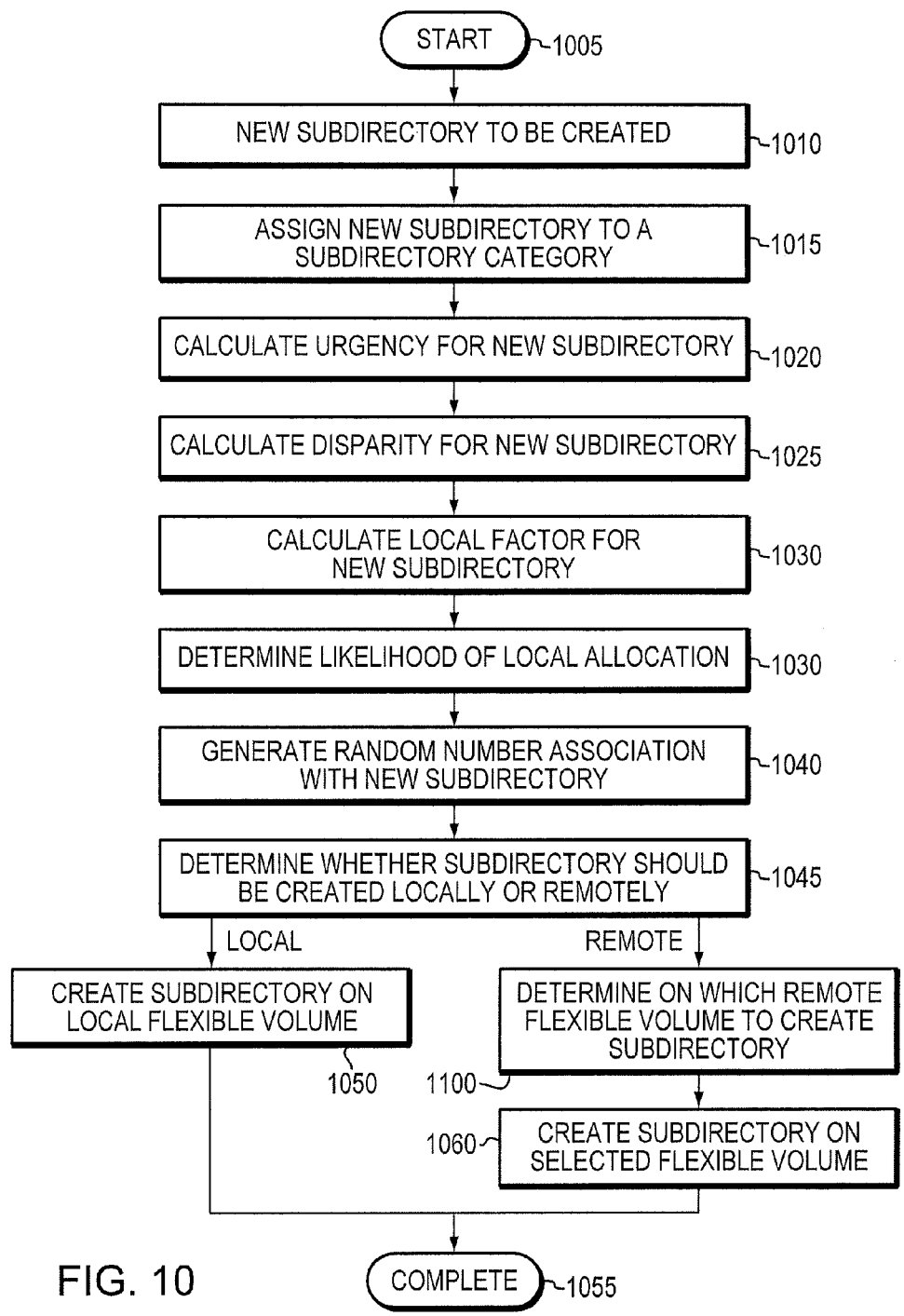
FIG. 10 is a flowchart detailing the steps of an exemplary procedure for determining whether to allocate a new data container on local or remote storage.

FIG. 10 is a flowchart detailing the steps of a procedure 1000 for determining whether a newly created data container should be stored locally or remotely. Illustratively, the newly created data container comprises a subdirectory to be stored on one or more storage containers, such as flexible volumes, being managed by the distributed file system. It should be noted that alternatively, differing levels of granularity may be utilized. As such, description of subdirectories being stored on flexible volumes should be taken as exemplary only. The procedure 1000 begins in step 1005 and continues to step 1010 where a new subdirectory is to be created.

Illustratively, a new subdirectory may be created in response to a user command to create a new subdirectory. The command may be initiated by an end user and/or an administrator of a storage system. Further, alternatively, a subdirectory may be created in response to storage operating system actions that do not receive user interaction. For example, a data backup operation (or other file system operation) may generate a temporary subdirectory for use during the processing of the operation. As such, the description of a subdirectory being created in response to a user command should be taken as exemplary only. Illustratively, the command to create a new subdirectory is processed by the file system 360, which then passes the operation to the remote access module 370, which assigns the new subdirectory to a subdirectory category in step 1015. Illustratively, the categories are utilized by the remote access module 370 as part of a first heuristic to determine whether the subdirectory should be created locally or on a remote flexible volume. Illustratively, there are four categories that may be utilized in relation to new subdirectories:

Category 1: (top level) is for subdirectories being created off of the root directory of the distributed file system Category 2: (high level) is used for subdirectories being created off of a directory that itself is within the root directory Category 3: (distinct parent) is used if the subdirectory is being created within a directory that has already reached a predefined size or already contains a predefined number of other subdirectories Category 4: (regular) is used if none of these other criteria apply.

It should be noted that the four categories are exemplary and that differing numbers of categories and/or criteria for categorizing subdirectories may be utilized. As such, the description of four categories and associated criteria that is contained herein should be taken as exemplary only.

Once a subdirectory has been assigned to a category, an Urgency Value is calculated for the new subdirectory in step 1020. Illustratively, the Urgency Value is represented as a percentage that is calculated by first selecting a threshold of free space that is deemed critical for the local container function optimally and then calculating the portion of that free space that has already been consumed. Illustratively, the threshold may be predefined at a certain percentage of the total size of the flexible volume, e.g., 33%. Illustratively, the threshold may be an identical percentage for all flexible volumes or may vary among flexible volumes, i.e., each flexible volume has an independent threshold value. Thus an Urgency Value of 0% means that the local flexible volume presently holds no data at all, while a 100% Urgency Value means that the local flexible volume is storing so much data that its free space is at or below the critical threshold.

A Disparity Value is then calculated for the new subdirectory in step 1025. Illustratively, the Disparity Value is represented as a percentage that is calculated as the difference between the percentage of free space within the most free flexible volume of the distributed file system and the percentage of free space within the local flexible volume. This difference is then illustratively divided by the percentage of free space within the most free flexible volume of the distributed file system. A Disparity Value of 0% means that the local flexible volume contains as much free space as does the most free flexible volume, while a Disparity Value of 100% means a local flexible volume has no free space at all. For example, if the local flexible volume is 60% free and the most free flexible volume is 80% free, the Disparity Value would be calculated as:

$$80\%-60\%=20\%$$

and then $$20\%/80\%=25\% \text{ Disparity Value}$$

In step 1030, a Local Factor is calculated for the new subdirectory. Illustratively, the Local Factor is calculated by multiplying the Urgency Value and Disparity Value and subtracting the result from 100%. That is, the Local Factor is calculated by:

$$100\%-(\text{Urgency Value} \times \text{Disparity Value})$$

In step 1035 a likelihood of local allocation is determined using the originally identified category and the computed Local Factor for the newly created subdirectory. For Category 1 allocations, a likelihood of local allocation is set at 100%, i.e., subdirectories created off of the root should always be allocated remotely. For Category 2 allocations, the likelihood of local allocation is illustratively set at 10% indicative that 90% of high level subdirectories should be allocated remotely. For Category 3 allocations, the likelihood of local allocation is defined as the Local Factor divided by 2. This indicates that even if the Local Factor is equal to 100%, half of all subdirectories created within a busy parent directory will be allocated remotely. For Category 4 allocations, the likelihood of local allocation is determined by multiplying the Local Factor by 95%. Thus for Category 4 allocations, even if the local factors 100%, then 5% of all subdirectories should be created remotely. It should be noted that the technique for determining the likelihood of local allocation described, different techniques may be utilized. As such, the specific percentages and calculations contained herein should be taken as exemplary only.

A random number associated with the new subdirectory is generated in step 1040. Illustratively, the random number has a value between 0-100. Using the likelihood of local allocation and the generated random number, a determination is made whether the subdirectory should be created locally or remotely in step 1045. Illustratively, the generated random number is compared to the likelihood of local allocation determined above in step 1035. As the likelihood of local allocation is a percentage value having a range from 0-100, a comparison may be made between the generated random number and the likelihood of local allocation. Should the generated random number be less than or equal to the computed likelihood of local allocation, then the remote access module determines that the subdirectory should be created locally. However, if the random number generated is greater than the likelihood of local allocation, then the subdirectory should be created remotely. Should the decision be made to generate locally, the procedure continues to step 1050 when the subdirectory is created on a local flexible volume. Procedure 1000 then completes in step 1055.

If, in step 1045, it is determined that the subdirectory should be created remotely, the procedure 1000 branches to step 1100, described below in reference to FIG. 11, where a determination is made as to which remote flexible volume should hold the newly created subdirectory. Once step 1100 finishes and a remote flexible volume is identified, the procedure 1000 then creates the subdirectory on the selected remote flexible volume. Illustratively, this may be accomplished by the remote access module 370 transmitting one or more messages using the CF protocol to a node that is servicing the desired remote flexible volume. The procedure then completes in step 1055.

Figure 11:
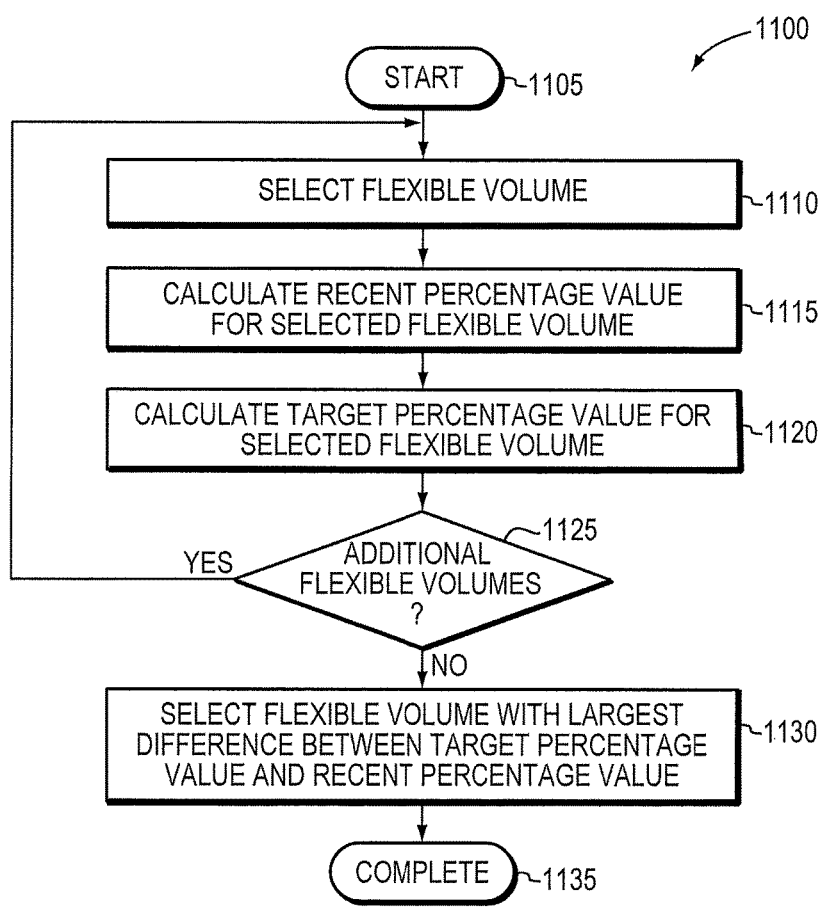
FIG. 11 is a flowchart detailing the steps of an exemplary procedure for determining which remote storage location to store a newly created data container.

FIG. 11 is a flowchart detailing the steps of a procedure 1100 for determining which remote flexible volume should store a newly created subdirectory. The procedure 1100 begins in step 1105 and continues to step 1110 where one of the remote flexible volumes is selected. A recent percentage value is then calculated for the selected flexible volume in step 1115. Illustratively, the recent percentage value is a count of the number of new data containers, e.g., subdirectories, created on the selected flexible volume. The counter that is maintained is reset at predefined intervals, e.g., every 10 seconds. The target percentage value represents a total percentage of subdirectories that have been created on the selected flexible volume within the recent time period, e.g., within the counter reset period, if the current subdirectory is created. That is, $$\text{Target Percentage Value}=(\text{Current Count}+1)/(\text{Sum of Counts for All Flexible Volumes}+1).$$

A target percentage value is then calculated for the selected flexible volume in step 1120. The target percentage value represents a targeted percentage based on the amount of free space within the distributed file system. That is, if the selected flexible volume represents 20% of the total free space within the distributed file system, then the target percentage value would be set to 20%.

The remote access module determines whether there are additional flexible volumes to be analyzed in step 1125. Should there be additional flexible volumes, the procedure 1100 loops back to step 1110 and selects a next flexible volume. However, if it is determined in step 1125 that no additional flexible volumes are to be analyzed, the procedure 1100 continues to step 1130 where the flexible volume with the largest difference between the target percentage value increase in percentage value is selected. The procedure then completes in step 1135.

The foregoing description has been directed to particular aspects of the disclosure. It will be apparent, however, that other variations and modifications may be made to the described subject matter, with the attainment of some or all of their advantages. Specifically, it should be noted that the principles of the subject matter may be implemented in non-distributed file systems. Furthermore, while this description has been written in terms of network and disk elements, the teachings of the disclosure are equally suitable to systems where the functionality of the network and disk elements are implemented in a single system. Alternately, the functions of the network and disk elements may be distributed among any number of separate systems, wherein each system performs one or more of the functions. Additionally, the procedures, processes and/or modules described herein may be implemented in hardware, software, embodied as a non-transitory computer-readable medium having program instructions, firmware, or a combination thereof. Therefore, it is the object of the appended claims to cover all such variations and modifications as come within the true spirit and scope of the subject matter of the disclosure.

What is claimed is:

1. A method comprising:
   receiving a command to create a data container;
   assigning, by a remote access module, the data container to one of a plurality of categories, wherein the plurality of categories comprises data containers being created off of a root directory, data containers being created off directory that is within a root directory and data containers being created off directory that is within a root directory;
   calculating, by the remote access module, an urgency value for the data container;
   calculating, by the remote access module, a disparity value for the data container;
   calculating, by the remote access module, a local factor for the data container; determining, by the remote access module, whether the data container is to be stored remotely, according to one of the plurality of categories, and the local factor; and
   in response to determining that the data container is to be stored remotely, determining, by the remote access module, one of a plurality of remote storage containers to store the data container by calculating a recent percentage for each of the plurality of remote storage containers, calculating a target percentage for each of the plurality of remote storage containers and selecting one of the plurality of remote storage containers having a greatest difference between the calculated recent percentage and the calculated target percentage.

2. The method of claim 1 wherein the data container comprises a subdirectory.

3. The method of claim 1 wherein the storage containers comprise flexible volumes.

4. The method of claim 1 wherein, in response to determining that the data container is not to be stored remotely, creating the data container on a storage container locally connected to a node.

5. The method of claim 1 wherein the local factor is calculated using the urgency value and the disparity value.

6. The method of claim 5 wherein the local factor is calculated by subtracting from a predefined value a value formed by multiplying the urgency value by the disparity value.

7. A network device comprising:
   a memory containing machine readable medium comprising medium executable code having stored thereon instructions for performing a method of adaptive data placement of a data container;
   a processing module coupled to the memory, the processor module configured to execute the machine executable code to:
   receive a command to create a data container;
   assign the data container to one of a plurality of categories, wherein the plurality of categories comprises data containers being created off of a root directory, data containers being created off directory that is within a root directory and data containers being created off directory that is within a root directory;
   calculate an urgency value for the data container;
   calculate a disparity value for the data container;
   calculate a local factor for the data container;
   determine whether the data container is to be stored remotely, according to one of the plurality of categories, and the local factor; and
   in response to determining that the data container is to be stored remotely, determine, by the remote access module, one of a plurality of remote storage containers to store the data container by calculating a recent percentage for each of the plurality of remote storage containers, calculating a target percentage for each of the plurality of remote storage containers and selecting one of the plurality of remote storage containers having a greatest difference between the calculated recent percentage and the calculated target percentage.

8. The network device of claim 7 wherein the one or more remote storage containers comprise flexible volumes.

9. The network device of claim 7 wherein the data container comprises a subdirectory.

10. The network device of claim 7 wherein the processor module is further configured to execute the machine executable code to, in response to determining that the data container is not to be stored on the at least one storage containers stored on storage devices associated with the node, determine on which of the one or more remote storage containers the data container is to be created.

11. The network device of claim 10 wherein the processor module is further configured to execute the machine executable code to query each other node of the cluster via the network to obtain information to calculate the recent percentage value.

12. A non-transitory machine readable medium having stored thereon instructions for performing a method of adaptive data placement of a data container, comprising machine executable code which, when executed by at least one machine, causes the machine to:
   receive a command to create a data container;
   assign the data container to one of a plurality of categories, wherein the plurality of categories comprises data containers being created off of a root directory, data containers being created off directory that is within a root directory and data containers being created off directory that is within a root directory;
   calculate an urgency value for the data container;
   calculate a disparity value for the data container;

calculate a local factor for the data container;
determine whether the data container is to be stored remotely, according to one of the plurality of categories, and the local factor; and
in response to determining that the data container is to be stored remotely, determine one of a plurality of remote storage containers to store the data container by calculating a recent percentage for each of the plurality of remote storage containers, calculating a target percentage for each of the plurality of remote storage containers and selecting one of the plurality of remote storage containers having a greatest difference between the calculated recent percentage and the calculated target percentage.

13. The non-transitory machine readable medium of claim 12 wherein the one or more remote storage containers comprise flexible volumes.

* * * * *